3,808,148
THERMOLUMINESCENT LITHIUM FLUORIDE
Guy Portal, Massy, France, assignor to Commissariat
 a l'Energie Atomique, Paris, France
No Drawing. Filed Feb. 1, 1972, Ser. No. 222,645
Claims priority, application France, Feb. 4, 1971,
7103757
Int. Cl. C09k 1/06
U.S. Cl. 252—408                               3 Claims

ABSTRACT OF THE DISCLOSURE

A compound having a thermoluminescent lithium fluoride base for the determination of absorbed dosages of ionizing radiation contains sodium and/or potassium in addition to the known activating elements which are currently employed for conferring thermoluminescence.

The presence of sodium or potassium permits elimination of unstable traps during the temperature rise which precedes a measurement, with the result that the product can be re-used a considerable number of times in succession without the need for regeneration.

---

This invention is concerned with a novel industrial product consisting of a compound having a thermoluminescent lithium fluoride base which can be employed for the determination of absorbed dosages of ionizing radiation, especially with a view to providing radiation protection.

Lithium fluoride, which is suitable for use in thermoluminescence dosimetry, is a commercially available product. It consists of an activated lithium fluoride, that is to say a lithium fluoride whose thermoluminescent properties have been improved by adding small quantities of impurities of different elements such as magnesium, calcium, barium, aluminum, titanium, europium, in quantities which are usually within the range of 20 to 400 p.p.m. in the case of each of these elements. These products have satisfied the requirements of users up to the present time but are nevertheless attended by a major drawback which will be explained hereinafter.

The measurement of the quantity of energy derived from ionizing radiations and stored in lithium fluoride is carried out in an apparatus known as a reader, in which the lithium fluoride is heated to a sufficient temperature to cause this latter to restore the energy in the form of light. During this progressive heating process, there appear traps in the lithium fluoride which become emptied at low temperature, which are consequently unstable and do not readily permit measurements over long periods of time (one month, for example). As a consequence, it proves necessary to carry out a heat treatment on the product between two successive periods of use in order to eliminate these parasitic traps. This operation complicates the measurements to a considerable extent and destroys the whole advantage of this system of dosimetry in the case of continuous measurements such as those which are necessarily carried out in compliance with established standards of radiation protection.

The precise aim of this invention is to provide a novel industrial product consisting of thermoluminescent lithium fluoride which can be employed without giving rise to the above-mentioned disadvantage. This lithium fluoride is characterized in that it contains sodium and/or potassium in addition to the known activating elements which are currently employed in order to endow it with thermoluminescence.

In the case of sodium, lithium fluoride preferably contains between 0.4 and 5% by weight of this element, and in the case of potassium between 1 and 10% by weight.

The weight percentages given above are expressed with respect to lithium fluoride in the case of the element considered but it must clearly be understood that these elements are present in the product in the form of fluoride.

The presence of sodium and/or potassium does not confer the requisite properties of thermoluminescence on lithium fluoride and it must therefore be emphasized that the lithium fluoride must contain both qualitatively and quantitatively the appropriate activating elements which are chosen from those referred-to above. On the other hand, the addition of sodium and/or potassium to a lithium fluoride which is already thermoluminescent makes it possible to eliminate the parasitic traps and to obtain a product which can be employed successively a large number of times without regeneration.

The minimum values indicated above in the case of the weight percentages of sodium and potassium correspond to a threshold below which the quality of the product is insufficient. However, it can be noted that, in the case of sodium, a slight improvement above 0.01% by weight is observed. Above the maximum values indicated, there is not found to be any appreciable improvement and the quality of the product is unnecessarily impaired by reason of an increase, both in the mean Z (which results in hypersensitivity at low energies) and also, in the case of lithium fluoride enriched in $^7$Li, in the sensitivity to thermal neutrons. By way of example, a product which has given excellent results contained 1% of sodium by weight.

Other elements can be present in the product as accidental impurities, these elements being, for example, Cu, Fe, Mn, Pb, etc.

Without necessarily having a harmful effect from the point of view of thermoluminescence, the presence of these impurities nevertheless gives rise to a two-fold disadvantage, namely on the one hand an increase in the mean Z and on the other hand the coloring of the product, which results in lower transparency to light and consequently in a lesser degree of sensitivity. It is consequently desirable as a rule to ensure that said impurities are present only in small quantities, for example less than 100 p.p.m. in the case of each of the elements considered.

The lithium fluoride in accordance with the invention can readily be fabricated according to a conventional method. The amorphous starting product having the desired composition is brought to the crystalline state by means of a suitable heat treatment carried out in an inert atmosphere and, after cooling, is ground and screened. The retained fraction having a particle size within the range of 50 to 200$\mu$ undergoes an annealing treatment in an inert atmosphere for a period of 48 hours, for example, and at a temperature of approximately 500° C., in order to confer final dosimetric properties on the product.

It should be noted that a similar treatment over a shorter period of time such as one-half hour, for example, is sufficient to regenerate a product which has been subjected to a high radiation dose, for example higher than 200 rads.

At lower levels of radiation, the product has a great advantage in that it may be re-used approximately 50 to 100 times (depending on the frequency of measurements) without regeneration. In fact, the traps which become emptied at low temperature make only a very small contribution to the thermoluminescence spectrum and correspond to energy levels which are sufficiently distant from that of the dosimetry peak to allow them to be readily eliminated by pre-heating carried out in the reader itself during the temperature rise which precedes the measurement.

What I claim is:
1. A composition having a base of thermoluminescent lithium fluoride, wherein said compound contains sodium fluoride and/or potassium fluoride in addition to the normal activating elements of magnesium, calcium, barium, titanium and europium employed for conferring thermoluminescence thereon.

2. A composition according to claim 1, wherein said compound contains between 0.4% and 5% by weight of sodium.

3. A composition according to claim 1, wherein said compound contains between 1 and 10% by weight of potassium.

References Cited

UNITED STATES PATENTS

| | | | |
|---|---|---|---|
| 3,427,452 | 2/1969 | Hartin | 252—301.4 R |
| 2,715,684 | 8/1955 | Schwarz | 252—301.4 R |
| 3,399,301 | 8/1968 | Schayes et al. | 250—71 |
| 3,021,286 | 2/1962 | Etzel et al. | 252—408 |
| 3,141,973 | 7/1964 | Heins et al. | 250—71 |
| 2,882,414 | 4/1959 | Joyner et al. | 250—83 |

FOREIGN PATENTS

| | | | |
|---|---|---|---|
| 53,839 | 10/1967 | Poland | 252—408 |

OTHER REFERENCES

Chem. Abstracts, 68:83598 (of Polish Pat. 53,839 above).

Chem. Abstracts, 74:18610.

GEORGE F. LESMES, Primary Examiner

W. R. DIXON, JR., Assistant Examiner

U.S. Cl. X.R.

250—483; 252—301.4 R